United States Patent
Lemons

(10) Patent No.: US 8,056,495 B2
(45) Date of Patent: Nov. 15, 2011

(54) PONTOON BIMINI EXTENDER AND RAIL CLAMPING MECHANISM

(76) Inventor: Daniel E. Lemons, Commerce Township, MI (US)

(*) Notice: Subject to any disclaimer, the term of this patent is extended or adjusted under 35 U.S.C. 154(b) by 257 days.

(21) Appl. No.: 12/428,612

(22) Filed: Apr. 23, 2009

(65) Prior Publication Data

US 2010/0050923 A1    Mar. 4, 2010

Related U.S. Application Data

(60) Provisional application No. 61/093,062, filed on Aug. 29, 2008.

(51) Int. Cl.
*B63B 17/00* (2006.01)

(52) U.S. Cl. .................................................. 114/361

(58) Field of Classification Search ............... 114/361
See application file for complete search history.

(56) References Cited

U.S. PATENT DOCUMENTS

| | | | |
|---|---|---|---|
| 2,714,387 A | 8/1955 | Meldrum | |
| 2,821,989 A | 2/1958 | Shepard | |
| 2,937,652 A | 5/1960 | Zimmer, Jr. et al. | |
| 3,165,111 A | 1/1965 | Foster | |
| 3,371,672 A | 3/1968 | Hale at al. | |
| 4,941,500 A | 7/1990 | Emard | |
| 5,367,977 A | 11/1994 | Ellis et al. | |
| 5,413,063 A | 5/1995 | King | |
| 5,706,752 A | 1/1998 | Menne, Jr. et al. | |
| 5,743,208 A | 4/1998 | Miller | |
| 5,803,104 A | 9/1998 | Pollen | |
| 6,006,692 A | 12/1999 | Szukhent, Jr. | |
| 6,032,694 A | 3/2000 | Wellen et al. | |
| 6,158,377 A | 12/2000 | Szukhent, Jr. | |
| 6,405,670 B1 | 6/2002 | Desantis | |
| 6,672,241 B2 | 1/2004 | Warfel et al. | |
| 6,820,569 B2 | 11/2004 | Warfel et al. | |
| 6,848,387 B1 | 2/2005 | Zalanka | |
| 6,907,642 B1 | 6/2005 | Czipri | |
| 6,971,925 B1 * | 12/2005 | Orange | 439/773 |
| 7,040,587 B2 | 5/2006 | Thompson et al. | |
| 7,051,669 B2 | 5/2006 | Warfel et al. | |
| 7,093,558 B1 | 8/2006 | Mandanici | |
| 7,162,968 B2 | 1/2007 | Thompson | |
| 7,370,597 B1 | 5/2008 | Schwindaman | |
| 7,373,897 B2 | 5/2008 | Tufte | |
| 7,395,774 B2 | 7/2008 | Borges et al. | |
| 7,395,775 B2 | 7/2008 | LaScala | |
| 2002/0129465 A1 | 9/2002 | Czipri | |
| 2002/0179134 A1 * | 12/2002 | Suh | 135/141 |
| 2005/0012004 A1 * | 1/2005 | Thompson et al. | 248/214 |
| 2005/0186029 A1 | 8/2005 | Jones | |
| 2006/0124045 A1 | 6/2006 | Tucker et al. | |
| 2006/0162640 A1 | 7/2006 | Tufte | |
| 2006/0162641 A1 | 7/2006 | Tufte | |

(Continued)

*Primary Examiner* — Stephen Avila
(74) *Attorney, Agent, or Firm* — Price Heneveld LLP

(57) ABSTRACT

A bimini extender fits overlappingly onto and extends forward of a pontoon's primary bimini for extended shade. The bimini extender includes a flexible cover that is at least about one-third of the deck surface area of the pontoon boat, a framework configured for attachment to one or both of the deck and pontoon's perimeter railing, a rear attachment structure for attaching the flexible cover to one of the deck, perimeter railing, and primary bimini, and a front attachment structure for attaching the flexible cover to the framework. The flexible cover shades an "extra" portion of the deck surface area. The bimini extender is made to be collapsible, removable, and storable, and further is made with robust and lower-cost components including a novel railing clamp, yet is aesthetic, durable and easily installable/removable.

26 Claims, 14 Drawing Sheets

U.S. PATENT DOCUMENTS

| | | |
|---|---|---|
| 2007/0062565 A1 | 3/2007 | Clarke |
| 2007/0137553 A1* | 6/2007 | Murray .................... 114/361 |
| 2007/0295263 A1 | 12/2007 | Fishburn |
| 2008/0011217 A1 | 1/2008 | Russikoff |
| 2008/0244820 A1 | 10/2008 | Moore |
| 2008/0312509 A1* | 12/2008 | Jacobson et al. ............ 600/230 |

* cited by examiner

PONTOON BIMINI EXTENDER AND RAIL CLAMPING MECHANISM

This application claims benefit under 35 U.S.C. §119(e) of provisional application Ser. No. 61/093,062, filed Aug. 29, 2008, entitled AUXILIARY PONTOON COVER, the entire contents of which are incorporated herein in its entirety.

BACKGROUND

The present invention relates to a shade for pontoons, and more particularly relates to an extender that can be attached to an existing bimini for extending its shaded area, and further that can be easily removed and stored in a compact arrangement.

Pontoon boats often include biminis (which are essentially collapsible umbrella-like shading) for partial shading of the boat's deck (e.g., about a rear third of the deck). Typically, the biminis include a tubular framework and a canvas cover that can be pivotally moved to a collapsed rearward position, such as on cloudy days when it is not necessary to have the bimini extended. However, a problem is that two-thirds of the deck remains uncovered and open to the sun, which can be extremely hot and unappealing to pontoon passengers. Thus, it is not uncommon for only a rear portion of many pontoon boats to be used on hot days, if at all.

Notably, making an existing bimini larger does not solve the problem, for several reasons. First, biminis can act like a sail, catching wind and interfering with operation of the boat. Further, large biminis can be aesthetically unattractive and further can be massive and expensive, both of which are undesirable. Still further, countless existing pontoon boats have biminis that only cover about a third of the pontoon's deck area. It is not possible to simply enlarge an existing bimini without substantial modification to the existing boat, including the purchase and design of the support structure and cover to be added.

Another problem concerns attaching bimini-supporting framework to a pontoon boat. Many pontoon owners are not skilled installers and/or do not like drilling holes and permanently attaching brackets/framework to their boats. Some find the process of folding (or erecting) the bimini framework to be confusing or at least not intuitive to them, especially when a tool is required. Further, over time, the bimini framework can become damaged, making it difficult to fold and/or erect . . . as well as becoming unsightly.

SUMMARY OF THE PRESENT INVENTION

In one aspect of the present invention, an apparatus is provided for pontoon boats having a deck with defined surface area, perimeter railing, and a primary bimini for shade. The apparatus includes a flexible cover having a surface area of at least about one-third of the deck surface area of the pontoon boat. A framework is configured for attachment to one or both of the deck and the perimeter railing, a rear attachment structure for attaching the flexible cover to one of the deck, the perimeter railing, and the primary bimini, and a front attachment structure for attaching the flexible cover to the framework with the flexible cover arranged to shade an addition portion of the deck surface area.

In another aspect of the present invention, an auxiliary bimini for a pontoon having a deck and a perimeter railing is provided, where the auxiliary bimini includes front and rear inverted U-shaped frames each including side-located vertical struts and a cross brace. First brackets on the struts of the front frame anchor the front frame to one of the deck and the railing, and second brackets on the struts of the rear frame anchor the rear frame to a portion of the railing. A flexible cover includes front and rear edges connected at multiple locations to the cross braces of the front and rear frames.

An object of the present invention is to provide an extended shade on a pontoon, and to do so with a secure but retractable bimini system that does not interfere with boat operation or appearance.

An object of the present invention is to provide a bimini extender that is collapsible, removable, storable, and yet that is cost-effective, durable, robust, and does not detract from the aesthetics of an existing pontoon boat.

In another aspect of the present invention, a clamping mechanism includes first and second clamping members each including a tube-engaging end and a clamp end, the tube-engaging ends opposing each other to define a square pocket for receiving a tube railing, at least one of the outer ends of the tube-engaging ends include a lip for engaging an outer side surface of the tube to ensure positive engagement with the tube, the clamp ends including aligned holes, respectively, with the hole in the lower clamp member being threaded. The clamping mechanism further includes a handle assembly with a threaded rod shaped to fit slidably through the aligned holes in the clamp ends and threadably engaging the hole in the clamp end of the second clamping member. The handle assembly also includes a handle movably mounted on a top of the rod between release and clamped positions, the handle including a cam that tensions the threaded rod for selectively tightening the upper clamp member against the lower clamp member when the handle is moved to the clamped position and for loosening the upper clamp member when the handle is moved to the release position.

These and other aspects, objects, and features of the present invention will be understood and appreciated by those skilled in the art upon studying the following specification, claims, and appended drawings.

BRIEF DESCRIPTION OF DRAWINGS

FIG. 11 is a perspective view of a modified pontoon.

FIGS. 12-13 are orthogonal exploded views of a clamp used in FIG. 11.

DETAILED DESCRIPTION OF PREFERRED EMBODIMENTS

Figure 1:
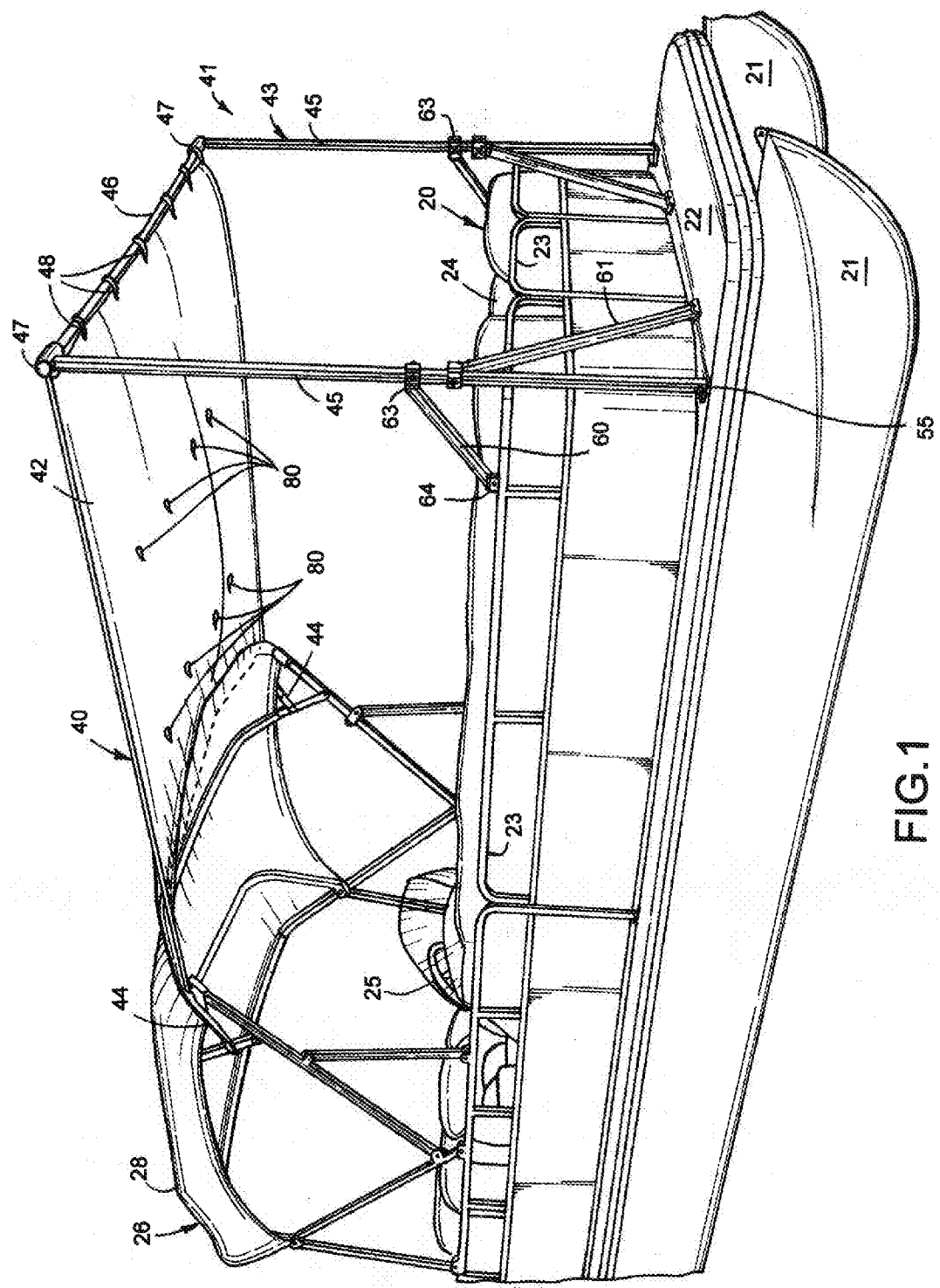
FIG. 1 is a perspective view of a pontoon including a bimini and a bimini extender embodying the present invention.

Pontoon boats with biminis for partial shading are well known in the art. The illustrated pontoon boat 20 (FIGS. 1-2) includes pontoons 21 for flotation, a deck 22, perimeter railing 23, seating 24, and a driver area 25 with steering and motor controls. A primary bimini 26 is supported over a rear third (or slightly more or less) of the boat 20 by tubular framework 27 for pivotal movement between an extended position which shades passengers in about a rear third of the boat 20, and a collapsed position where the canvas cover 28 is folded and the framework collapsed to a U-shape. A bimini extender 40 embodying the present invention is attached to the pontoon boat 20 for extending the shade to the entire deck 22. Advantageously, the bimini extender 40 with concepts embodying the present invention makes the entire deck 22 functional even on hot or humid days. Yet, the bimini extender 40 is removable and/or collapsible for quick storage and transport. Further, the bimini extender 40 is made so as to not undesirably act as a sail that catches wind and "fights" operation of the pontoon boat 20. Still further, the bimini extender 40 is attachable (retrofittable) to the existing structure of a pontoon boat 20 without the need for undesirable and/or substantial modification to existing structure of the pontoon boat 20. Also, the installation does not require sophisticated skill for installation, but instead can be done by boat owners of limited skill level and with few tools. Notably, a person of ordinary skill in this art will recognize that the present bimini extender (and related concepts) can be easily modified for installation onto other pontoon boats, other watercraft and other similar structures (such as floating decks and diving platforms, outdoor shaded structures, and the like) where it is desirable to extend an existing shade.

Figure 6:
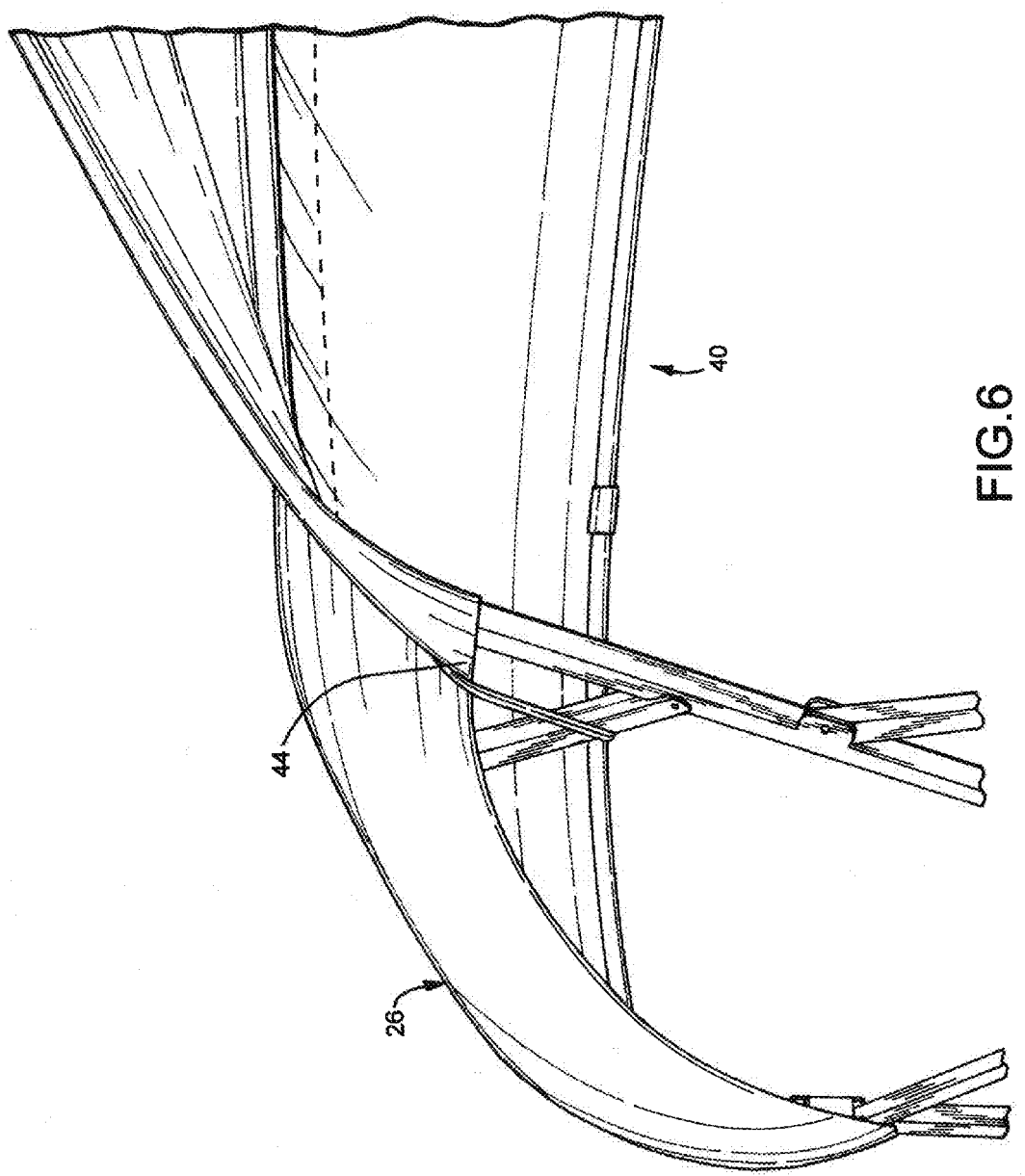
FIG. 6 is an enlarged perspective view of a rear, top of the rear support.

The bimini extender 40 (FIG. 2) includes a supporting framework 41 and a canvas or fabric cover 42 (preferably a flexible lightweight fabric such as an anti-tear material often used for parachutes or water environments). The framework 41 includes an inverted U-shaped front support 43 and a pair of rear tie straps 44. The rear straps 44 (FIG. 6) are configured to be wrapped around an upper part of the existing framework 27, and are preferably fabric strips with ends that can be releasably fastened together, such as with Velcro® material or the like. A rear edge of the cover 42 is sufficiently stiff (and can include a stiff pole or insert if desired) and the straps 44 pull sufficiently downward such that attachment of the rear corners of the cover 42 to the framework 27 retains the bimini extender 40 to the existing bimini 26 in an overlapping edge condition. For example, a rear edge of the bimini extender cover 42 can be pulled downward such that its center region effectively "hangs onto" a forwardmost overhead beam of the primary bimini's supporting framework 27.

Figure 2:
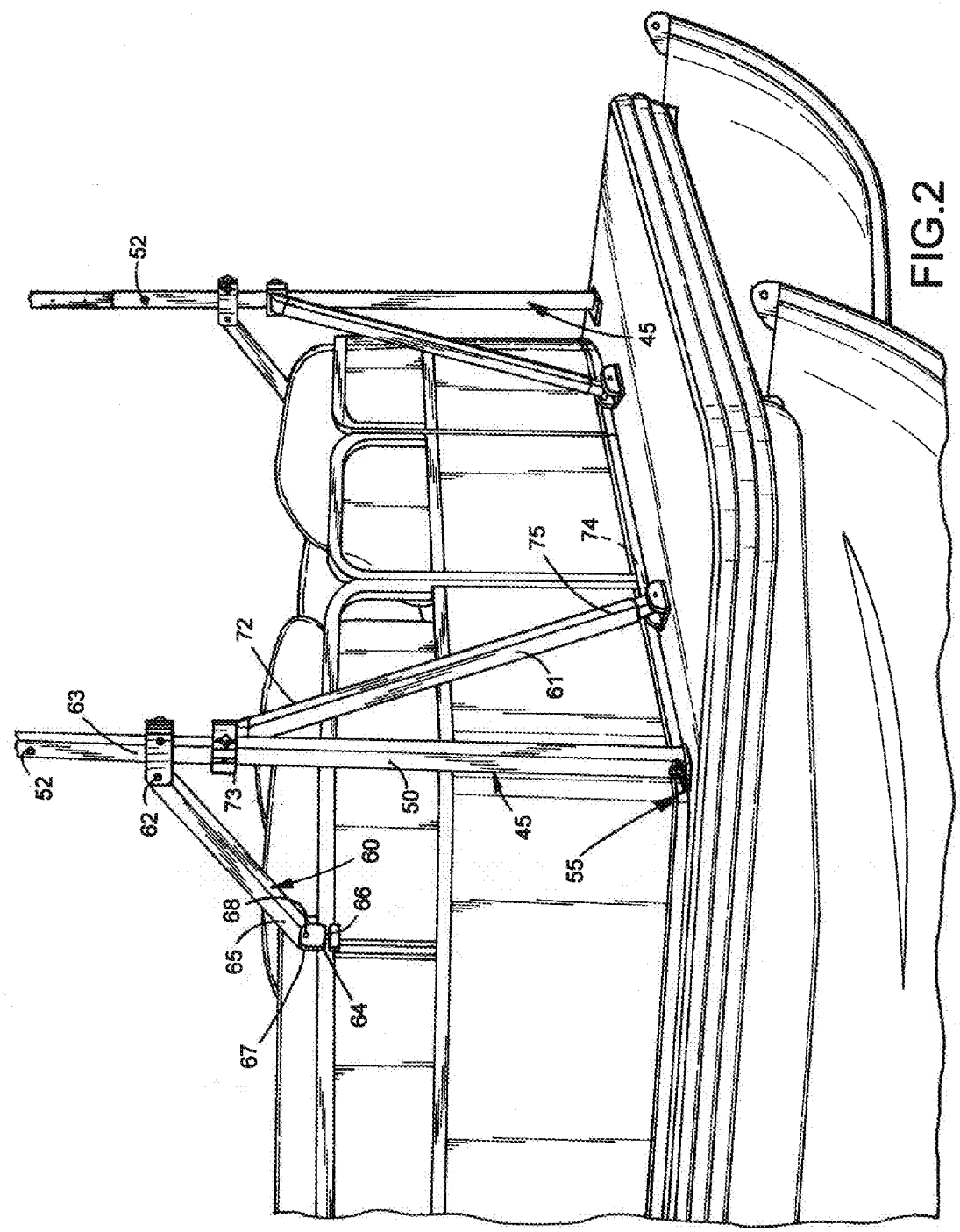
FIG. 2 is an enlarged view of a front support for the bimini extender.

FIG. 2 is a perspective view of the front support 43 for the bimini extender 40. The front support 43 includes a vertical tubular side strut 45 at each corner of the boat 20, and a tubular cross piece 46 attached via corner brackets 47. The corner brackets 47 are polymeric structures (or can be metal or other material) and include a long socket for telescopingly receiving the end of the cross piece 46, and a vertical socket for receiving a top of the side strut 45. The strut 45 and cross piece 46 are attached to the corner brackets 47 as desired, such as by a set screw, pin, or other fastening means. A front of the cover 42 includes a plurality of spaced loops 48 attached to a front edge of the cover 42 and that loop around the cross piece 46, thus tensioning the cover 42 between its front and rear connections. The illustrated loops 48 are fabric strips and can be made releasable such as by using Velcro® if desired, but it is not contemplated that they need to be fabric nor releasable. The cross piece 46 can be made telescopingly extendable if desired, such that the present system can be attached to pontoon boats having different widths.

Figure 3:
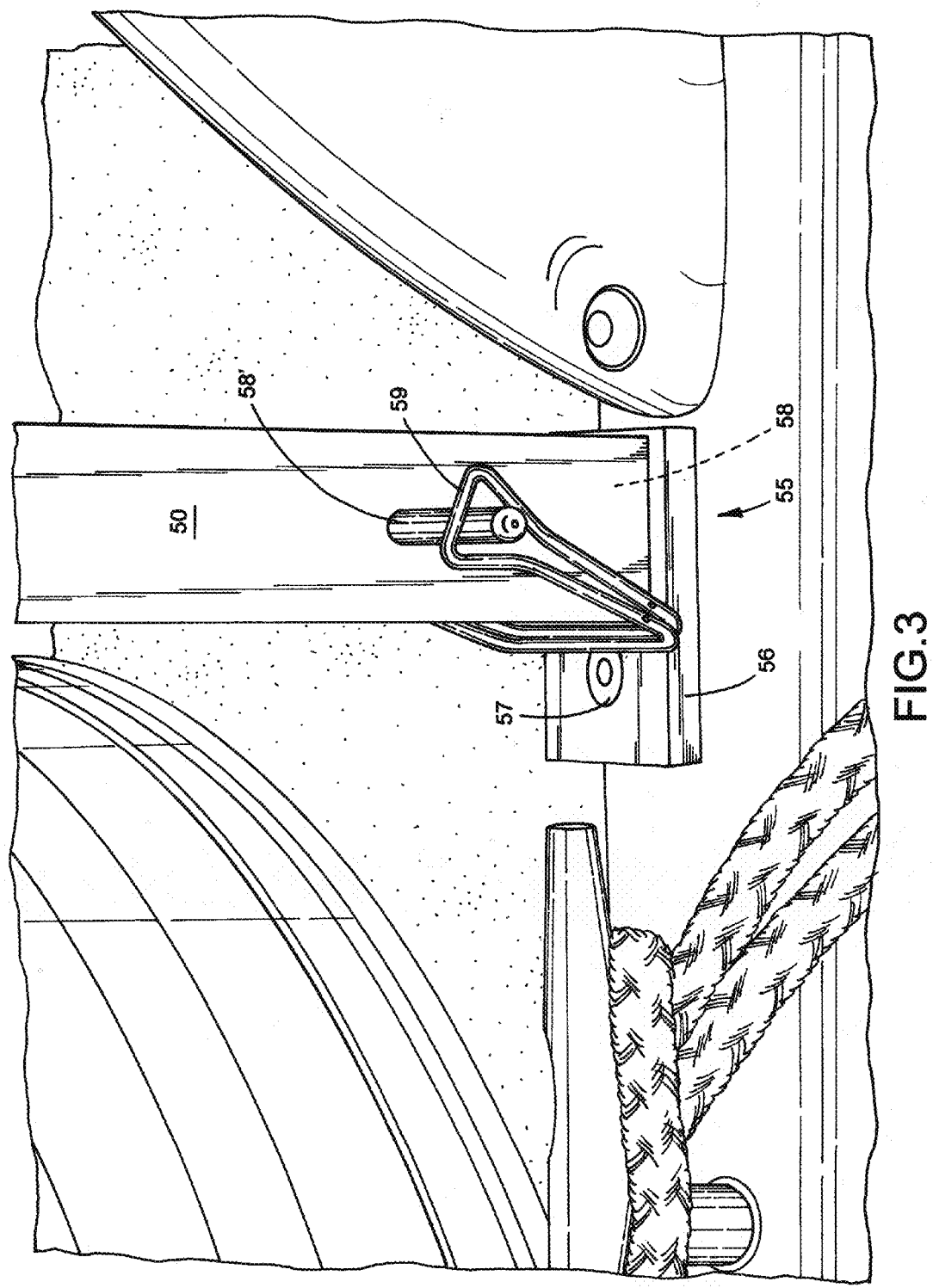
FIGS. 3-4 are further enlarged views of a bottom of the front support.
Figure 4:
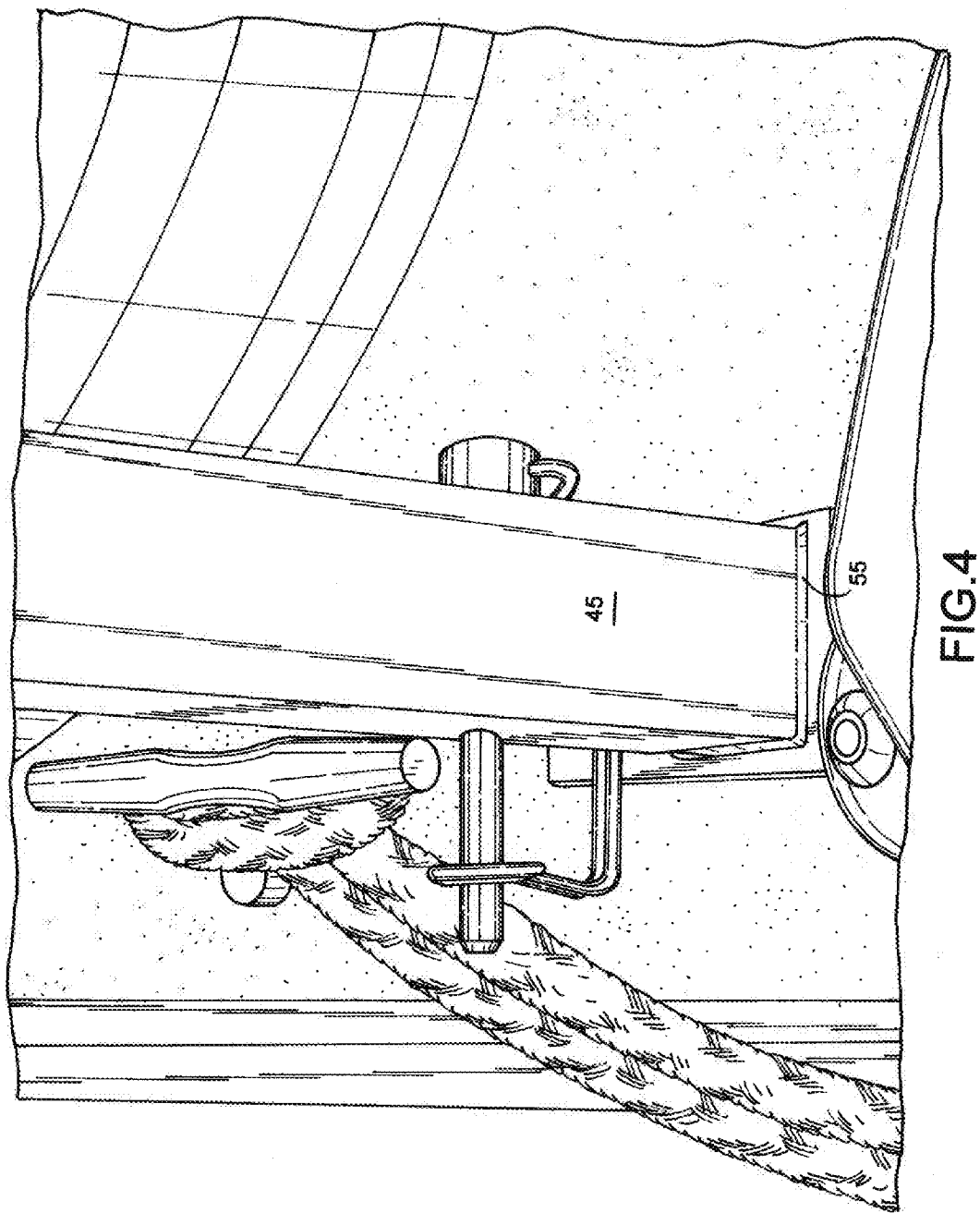
Figure 5:
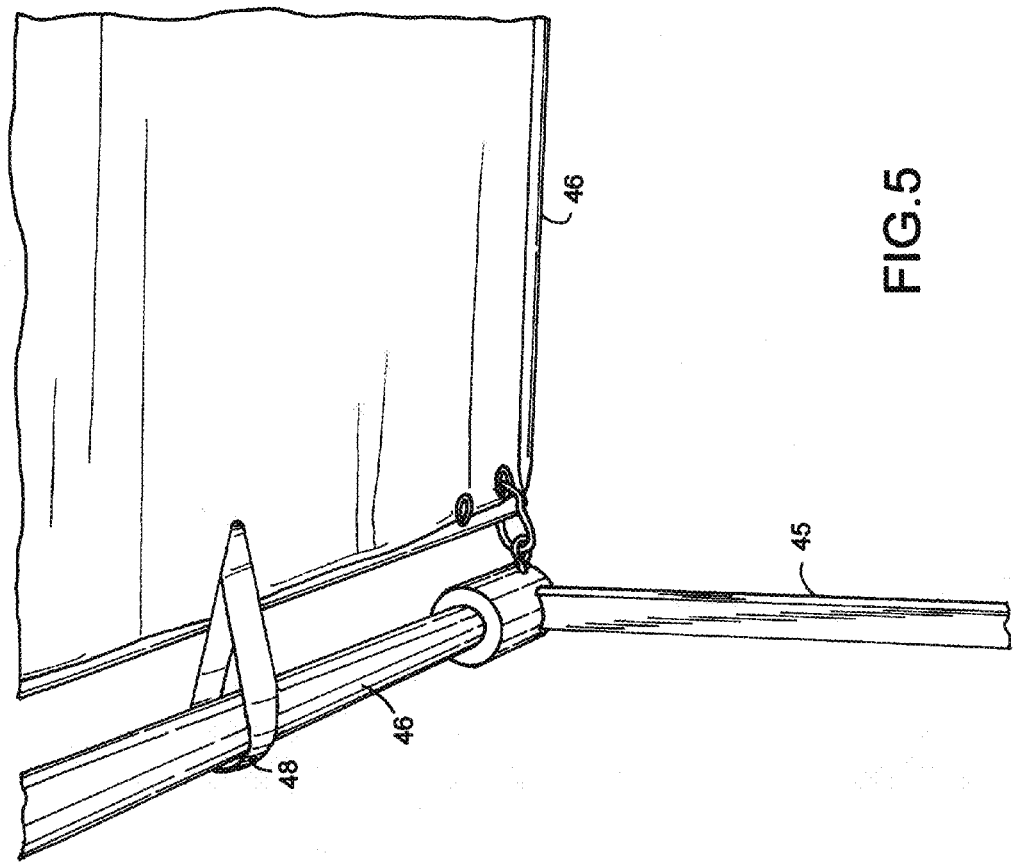
FIG. 5 is a further enlarged view of a top of the front support.

The side struts 45 (FIG. 2) comprise a pair of tubes 50 telescopingly engaged and including a center clamp or pin 52 and/or a turn screw such that a height of the side struts 45 can be raised or lowered. A floor mount 55 (FIGS. 3-4) includes an apertured flange 56 that can be easily attached to the deck 22 by a screw or bolt 57. The mount 55 includes a vertical tube 58 that matably receives a lower end of the bottom tube 50, and a pin retainer 58' extends through the tube 58 and bottom of tube 50. A bent-wire cotter-pin-like retainer 59 engages the pin retainer 58' to keep the pin retainer 58' in position, but the bent-wire retainer 59 forms a loop to facilitate removal of the pin retainer 58' and in turn removal of the strut 45.

Two stabilizer tubes 60 and 61 (FIG. 2) extend at 90 degrees from the strut 45 for stabilizing the struts 45 in their vertical positions. The stabilizer 60 extends at an angle in a fore-aft direction, and includes an upper/forward end 62 connected to the strut 45 by an upper bracket 63 and a lower/rearward end 65 connected to the strut 45 by a lower bracket 64. The upper bracket 63 slides vertically on the strut 45 and includes a clamping portion and a bolt/screw for clamping the upper bracket 63 in place on the strut 45. By releasing the bolt/screw, the stabilizer 60 is released from the strut 45. The lower bracket 64 includes a bottom flange 66 forming a bottom pocket for matably engaging a top rail of the perimeter railing 23, and a top flange 67 forming a top pocket for matably receiving a bottom end of the stabilizer 60. A pivot pin 68 connects the stabilizer 60 to the lower bracket 64, but allows the stabilizer 60 to pivot forward to a flat storage position on the top rail of the perimeter railing 23.

The second stabilizer 61 extends at an angle transversely across the boat 20, and includes an upper/forward end 72 connected to the strut 45 by an upper bracket 73 and a lower/rearward end 75 connected to the strut 45 by a lower bracket 74. The upper bracket 73 is similar to bracket 63, and the lower bracket 74 is similar to lower bracket 64, such that a repetitious discussion is not required.

The illustrated cover 42 (FIG. 1) is relatively large (e.g., large enough to cover two-thirds of an area of the deck 22), however the cover 42 is held in a relatively flat position such that it provides only limited wind resistance. In other words, it does not act like a sail. If desired, rod-like stiffeners (not specifically shown, but for example can be ¼"×1"×72" metal or plastic strips, see laterally-oriented stiffeners 90 in FIG. 7, or longitudinally-oriented stiffeners 90A in FIG. 8) are attached to the cover 42 to prevent sagging and/or to give the cover 42 a raised center. For example, the stiffeners can be releasably attached to the cover 42 using spaced straps 80 that hold the stiffeners tight to a bottom of the cover 42. Alternatively, the stiffeners can be attached to a top surface of the cover 42, and bowed/arched over the cover 42 such as by capturing their ends on the cover 42. Intermediate straps would be used to connect a center section of the stiffeners to the cover 42.

The illustrated bimini extender 40 including its framework 41 and cover 42 can be easily attached to an existing pontoon boat 20 with primary bimini 26 and with minimal modification of components on the existing pontoon 20. Further, the bimini extender 40 can be easily erected to its use position. Further, the bimini extender 40 can be easily collapsed to a forwardly-folded storage position (still-attached) and/or can be easily totally removed from the pontoon boat 20 (except of course the attachment brackets and/or parts of the framework 41 intended to be pivoted to a storage position while still attached to the pontoon boat 20.

Figure 7:
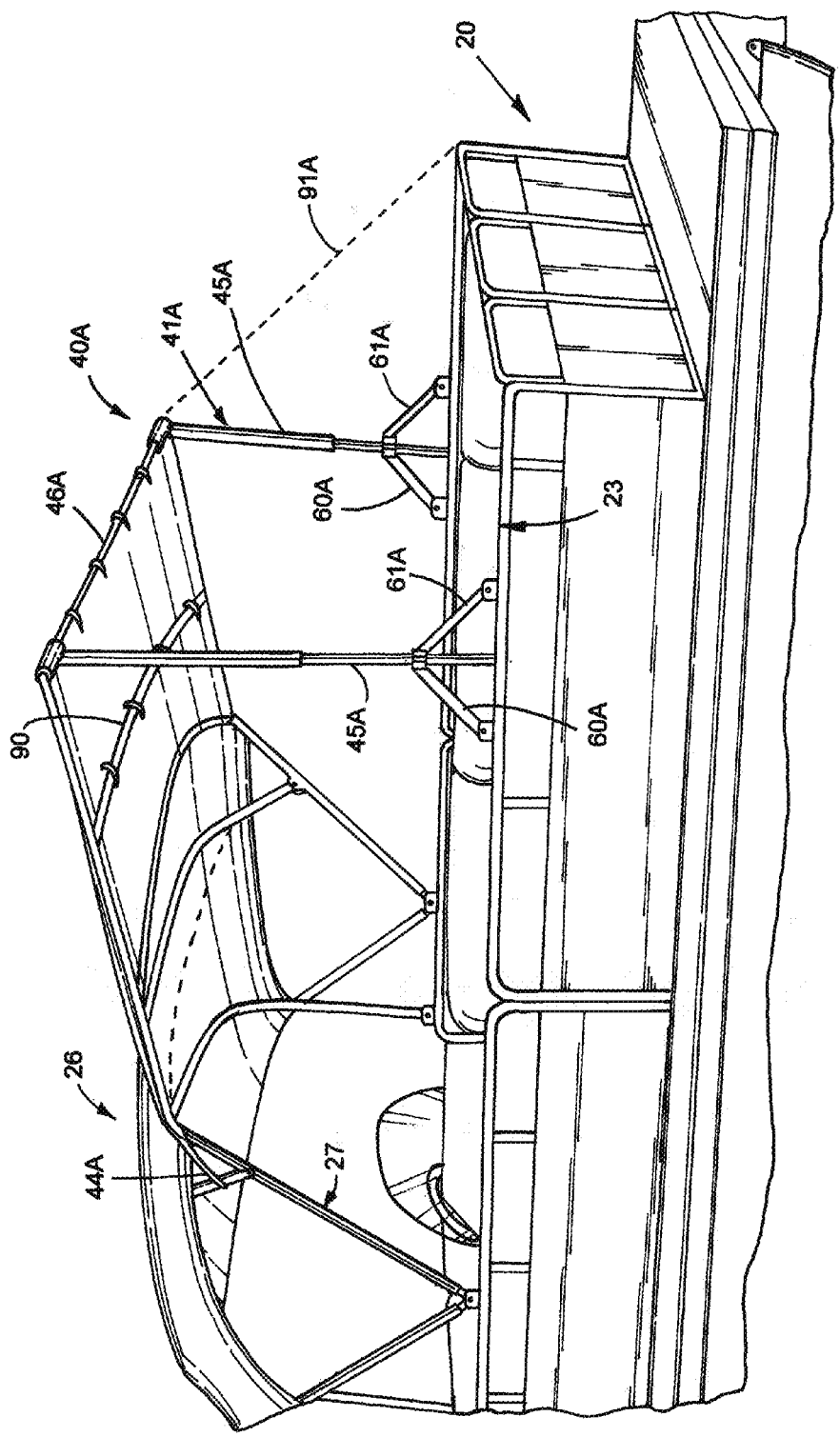
FIGS. 7-8 are perspective views of modified bimini extenders, FIG. 7 showing cover-supporting cross braces extending in a lateral direction and FIG. 8 showing cover-supporting cross braces extending in a longitudinal direction.

It is contemplated that a bimini extender 40 can be constructed that covers only a portion of a pontoon boat 20, instead of covering an entire portion forward of the primary bimini 26. Specifically, FIG. 7 is a perspective view of a modified bimini extender that covers about an additional one-third of a deck 22 ahead of the primary bimini 26. The illustrated bimini extender 40A includes similar components to the bimini extender 40, and similar or identical components are identified using similar numbers but with the letter "A." This is done to reduce redundant discussion. In bimini extender 40A, the struts 45A are positioned rearward of a front corner of the boat 20 above a top rail of the perimeter railing 23, and are clamped by brackets to a top of the perimeter railing 23. The struts 45A are stabilized by angled tubular stabilizers 60A and 61A. Notably, the rear stabilizer 61A is basically the same as stabilizer 60A and extends in a same plane along/above the top rail of the perimeter railing 23. It is contemplated that the front support 43A can be further stabilized by stabilizer straps 91A extended from each front corner of the cover 42A to a front corner of the pontoon 20, if desired. Also, note the laterally-oriented stiffeners 90 in FIG. 8, and longitudinally-oriented stiffeners 90A in FIG. 8, both of which were mentioned in the above description.

Figure 8:
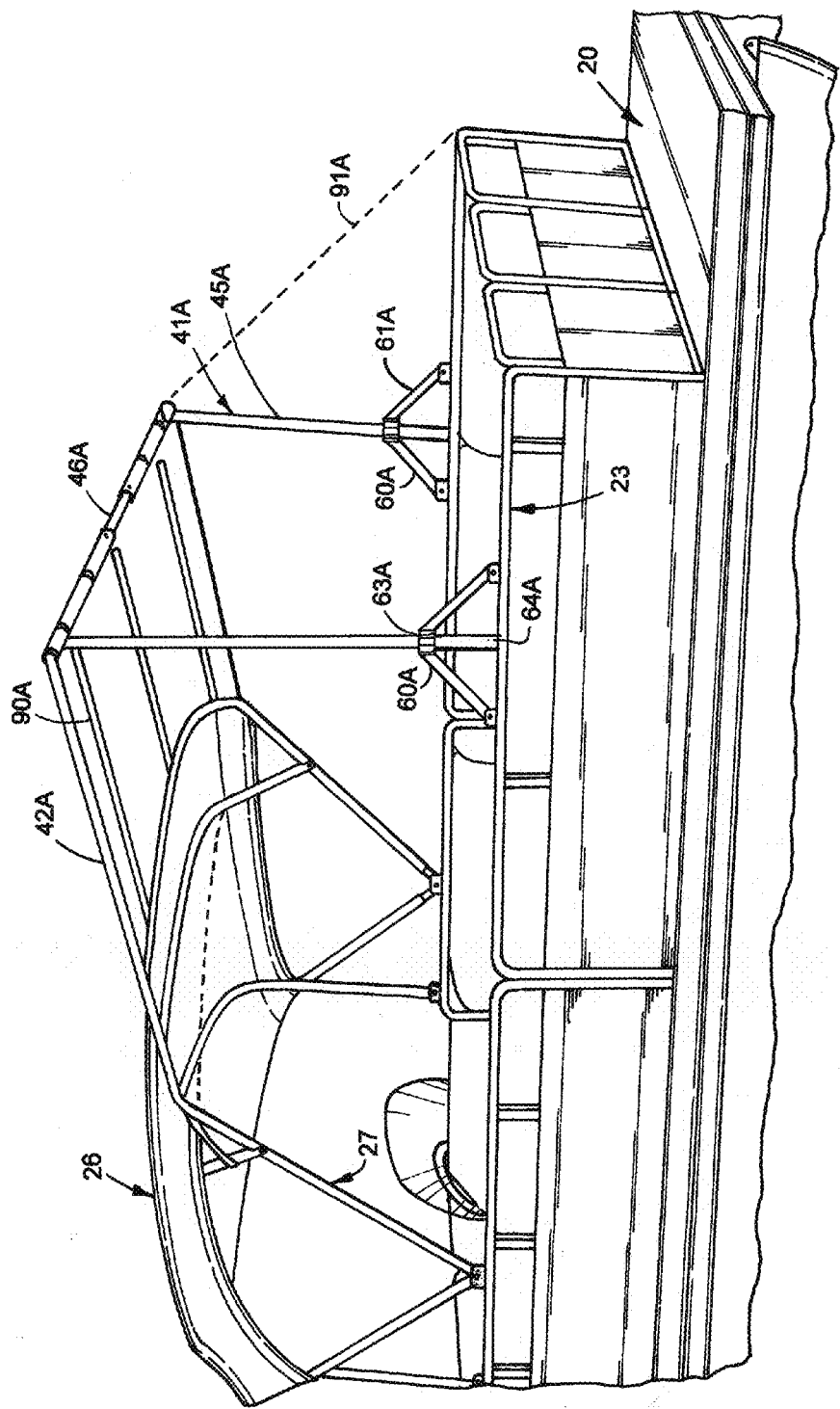
Figure 9:
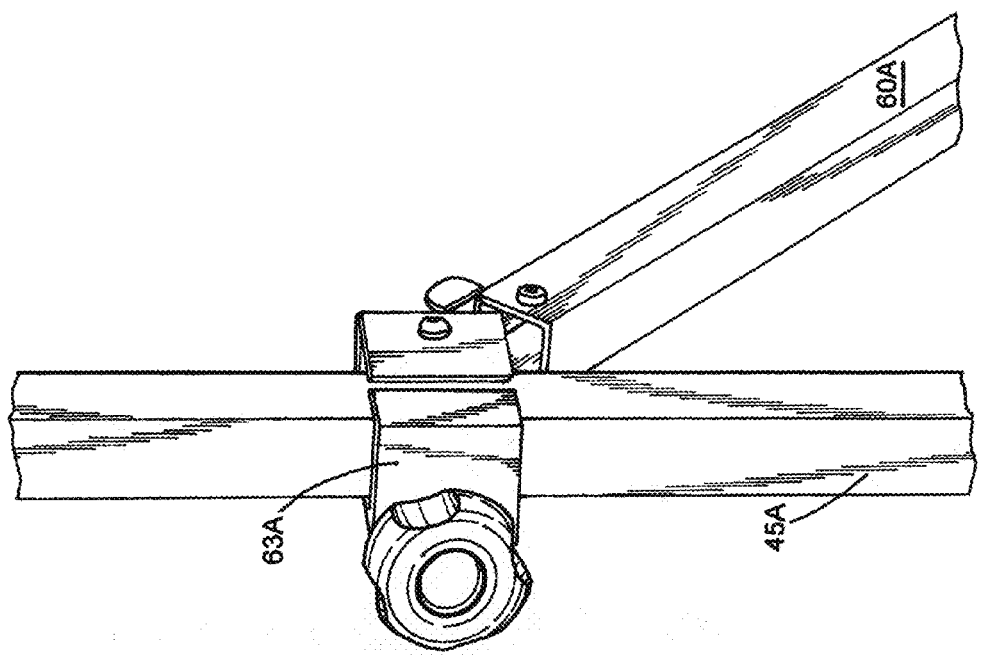
FIGS. 9-10 are additional perspective views of the pontoon and FIGS. 11-12 are perspective views of the mid-level clamping bracket and rail-engaging lower clamping bracket for clamping to the perimeter railing of the pontoon.
Figure 10:
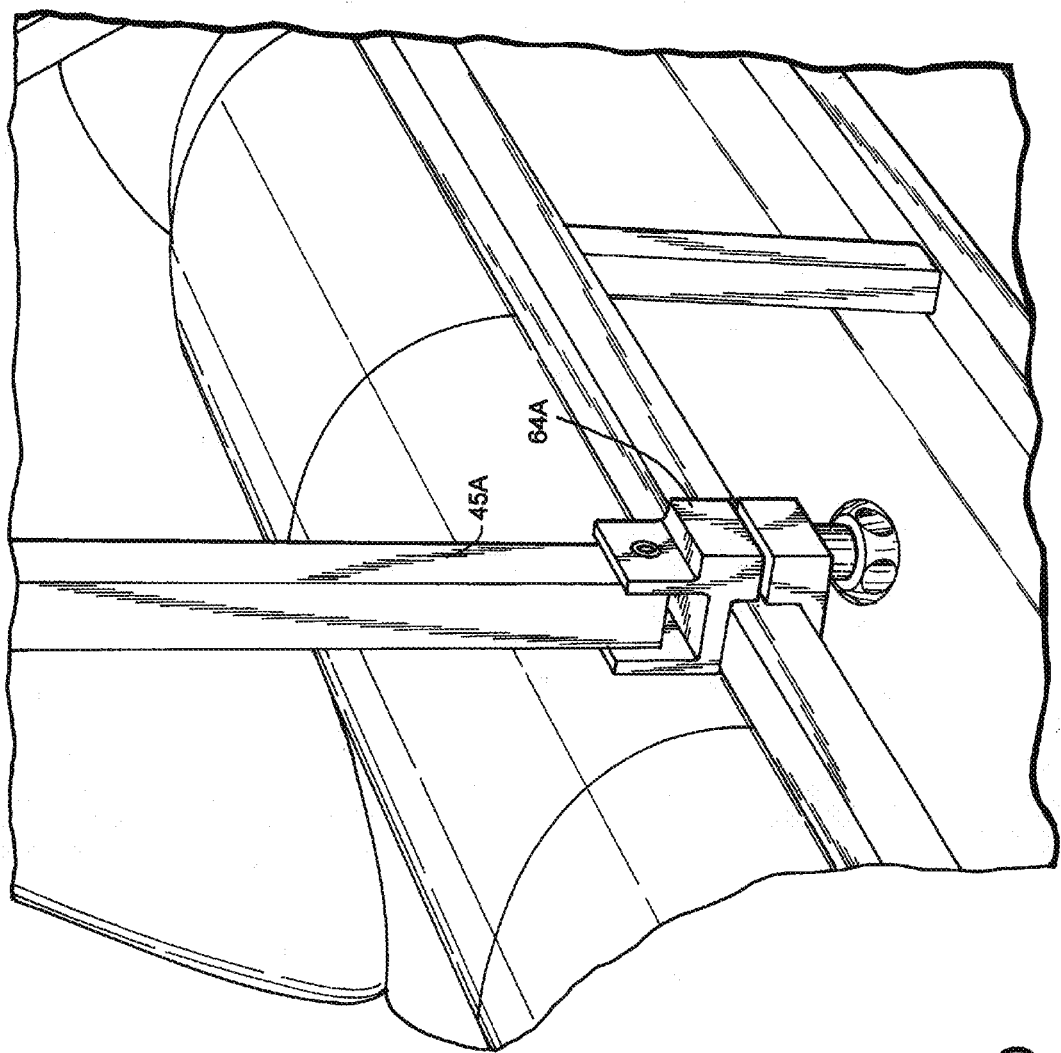
Figure 11:
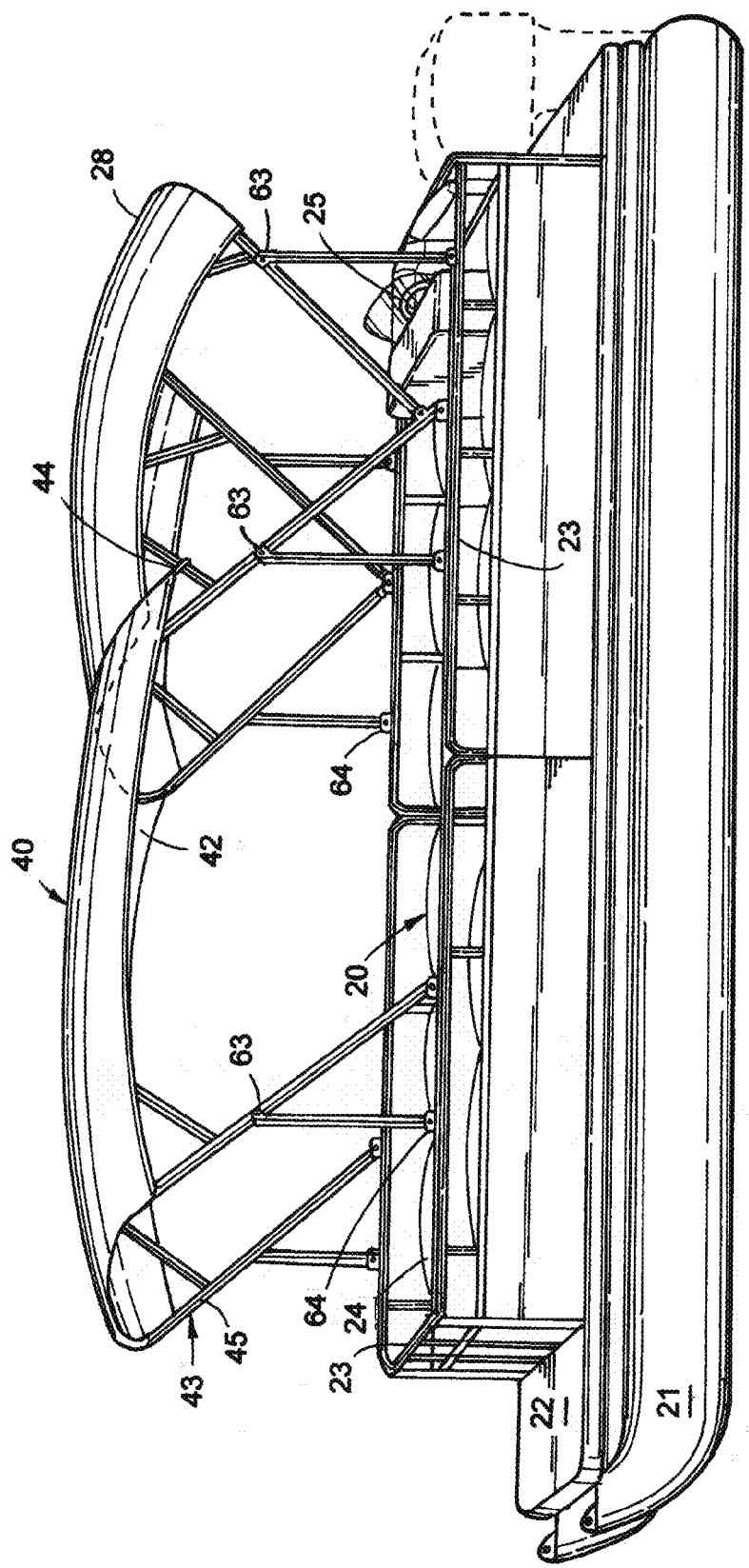
Figure 13:
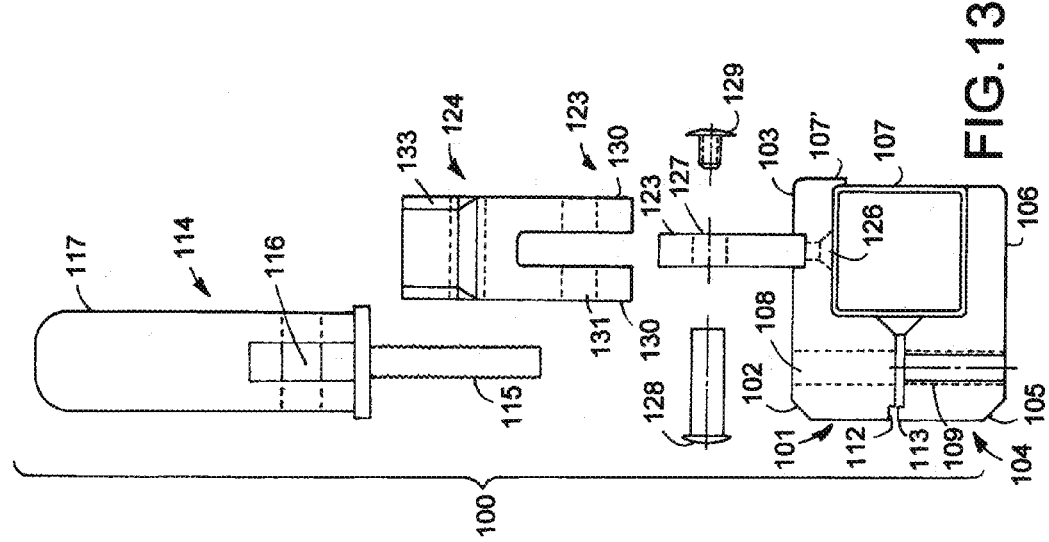
Figure 12:
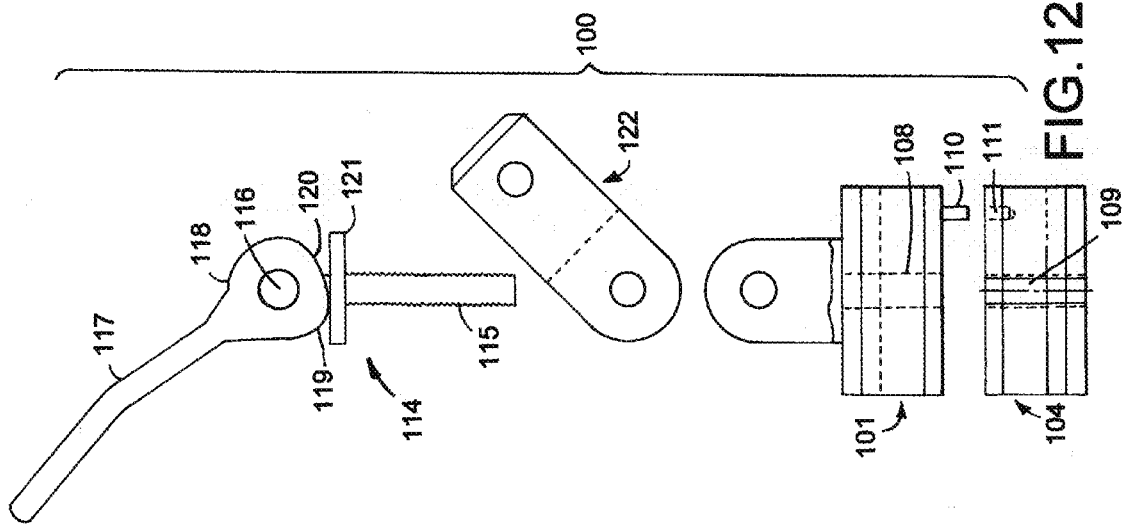
Figure 15:
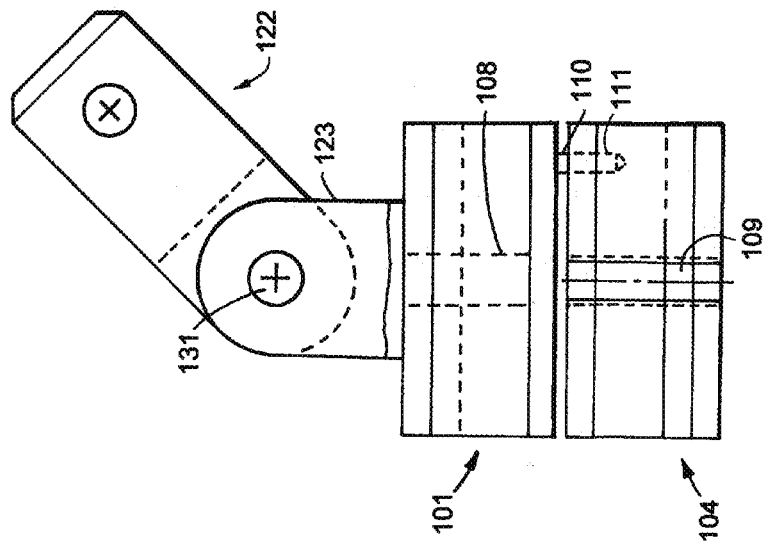
FIGS. 14-15 are orthogonal views of the assembled clamp from FIG. 12.
Figure 14:
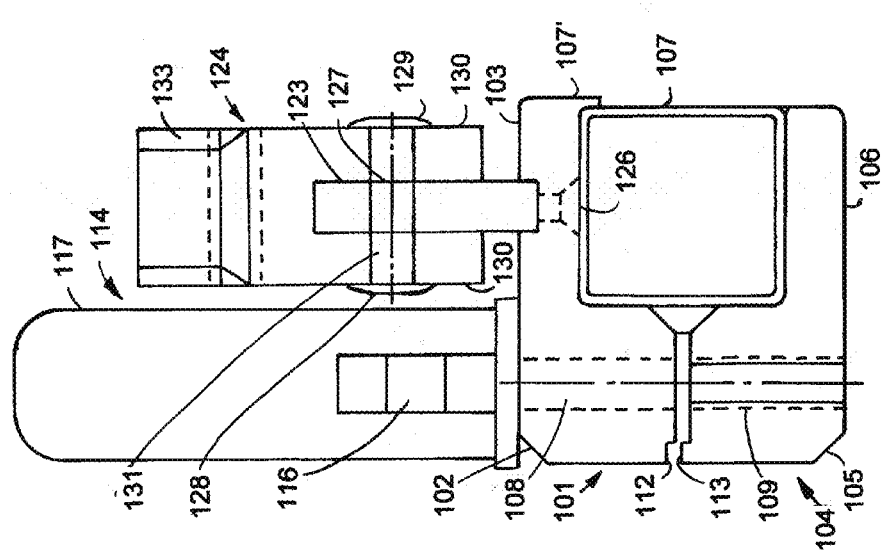
Figure 17:
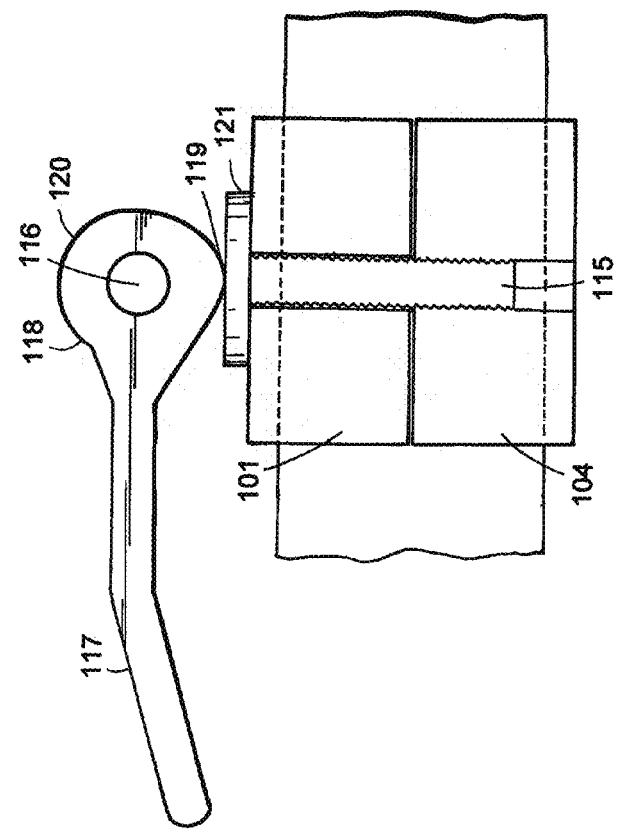
FIGS. 16-17 are side views of the assembled clamp in FIG. 14, FIG. 16 showing the locking handle as unlocked and in FIG. 17 as locked.
Figure 16:
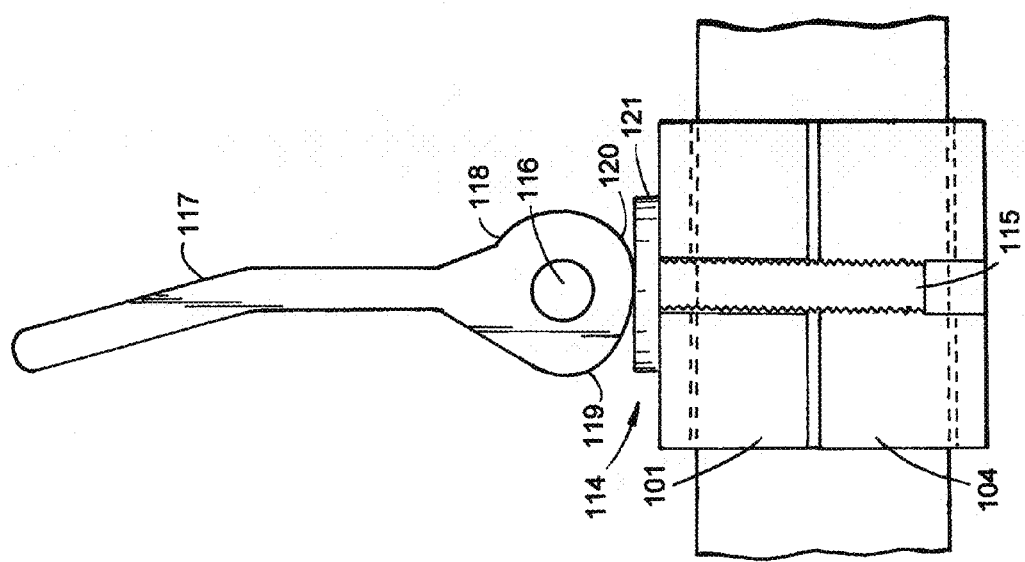

FIG. 8 illustrates a modified bimini extender 40A like that shown in FIG. 7, but modified clamping brackets 63A and 64A are used. The clamping bracket 64A (FIG. 12) includes opposing clamp members that matably engage opposing sides of the top rail of the perimeter railing 23, and include a threaded stud with hand grip for clamping the clamp members together to grip the top rail. Further, the top clamp member includes upward spaced-apart flanges that receive and are pivotally attached by a horizontal pivot pin to a lower end of the strut 45A (or to a lower end of the angled brace 60A). The mid-level clamping bracket 63A (FIG. 11) also includes similar opposing clamp members and a threaded stud with hand grip for clamping onto the strut 45A, and includes similar spaced-apart flanges that receive and are pivotally attached to an upper end of the angled brace 60A. By this arrangement, the clamp brackets 63A and 64A can be easily loosened and slid to orient the struts 45A in a vertical use position or to orient the struts 45A in a horizontal storage position (against a top of the top rail) . . . or can be loosened (without the use of separate tools) to totally remove the bimini extender 40A from the pontoon.

Notably, two of the frames 27A can be attached to the top rail of the perimeter railing 23 using brackets 63A and 64A, struts 45A and braces 60A with a cover 42A extending between the two cross braces 46A. This provides a stand-alone auxiliary bimini cover that can be attached to existing pontoons, even where the pontoon does not have a primary bimini cover.

A clamping mechanism 100 (FIG. 12-17) (also called a "clamp assembly" or "clamp") includes an upper clamp member 101 with clamp end 102 and tube-engaging end 103, and a lower clamp member 104 with clamp end 105 and tube-engaging end 106. The tube-engaging ends 103 and 106 oppose each other to define a square pocket for receiving the tube 107 forming the railing 23. At least one of the outer ends of the tube-engaging ends 103 and 106 include a lip 107' for engaging an outer side surface of the tube 107 to ensure positive "captured" engagement with the tube 107. The clamp ends 102 and 105 include aligned holes 108 and 109, respectively, with the hole 109 in the lower clamp member 104 being threaded. The clamp ends 102 and 105 also include a mating pin 110 and hole 111 that engage to maintain alignment of the clamp members 101 and 104, so that one member does not skew or twist relative to the other. Also, the clamp ends 102 and 105 also include a channel 112 and mating ridge 113 that extend parallel the tube 107 which inter-engage and also help to maintain alignment of the clamp members 101 and 104, so that one member does not skew or twist relative to the other.

A handle assembly 114 (FIGS. 12-13) includes a threaded rod 115 shaped to fit slidably through the hole 108 and threadably engage the hole 109. A top of the rod 115 includes a transverse rod section 116 forming an axle, and a handle 117 rotatably mounted on the rod 116. The handle 117 includes a cam 118 with protruding surface portion 119 and recess surface portion 120 on its outer surface, and a washer 121 on the threaded rod 115 under the cam 118. By manipulating/rotating handle assembly 114 about the axis of the threaded rod 115, the threaded rod 115 can be rotated into the threaded hole 109, such that the handle 117 and washer 121 gradually tighten the upper clamp member 101 against the lower clamp member 104. In an assembled position, the handle 117 can be moved to a release position (FIG. 16) where the clamping members 101 and 104 are sufficiently loose to slide along the railing tube 107. Preferably, they cannot be rotated relative to each other nor pulled off the railing. In this release position, the recess surface portion 120 is loosely engages (or is spaced slightly from) the washer 121.

When the handle 117 is rotated about transverse rod section 116 (FIG. 17), the protruding surface portion 119 presses against the washer 121, causing tension on the rod 115 and pulling the clamping members 101 and 104 tightly together . . . such that they clamp onto the railing tube 107, fixing its position on the railing. In a preferred form, the protruding surface portion 119 moves slightly over center to assure that it does not accidentally unexpectedly disengage. Notice the gap 120 in FIG. 17 (when the clamping members are clamped together) is slightly less than the similar gap 121 in FIG. 16. It is noted that a size of the gap 120 can be small or even zero, depending on an accuracy of the tube 107 and clamp members 101 and 104 (and their tendency to deform). It is contemplated that a rubber or other gripping material can be placed in the cavities of the clamping members 101 and 104 for assuring good frictional engagement with the tube 107, and for providing some cushioned engagement.

A frame-supporting bracket 122 (FIGS. 12-13) includes a pivot stanchion 123 and a tube-engaging bracket 124. The pivot stanchion 123 includes a block shaped to fit into an up-facing groove on a top of the clamp end 102 of the upper clamp member 101, the groove extending parallel the tube 107. A screw 126 threads into the stanchion 123 from a tube-engaging surface of the clamp end 102 of the upper clamp member 101, fixing the attachment. An upper end of the stanchion 123 includes a transverse hole 127 for receiving a pivot/sleeve nut 128 and threaded stud 129. The tube-engaging bracket 124 includes a pair of legs 130 with a space therebetween for receiving the stanchion 123. Holes 131 in the legs 130 align with the hole 127, allowing the pivot/sleeve nut 128 and threaded stud 129 to pivotally attach the tube-engaging bracket 124 to the stanchion 123. An upper end 133 of the bracket 124 includes a stud section for matably engaging an end of a downwardly-extending tube on the overhead bimini frame (such as components 45, 60, or 65). The upper end 133 can extend into the open end of the downwardly-extending tube (as shown), or can form a pocket for recieivng it. Also, their engagement can be secured with a self-tapping screw or other clamping/retaining/friction-generating mechanism.

The clamp 100, including its handle which moves over center for quick-action clamping, is believed to be particularly novel, useful, and unobvious, and it has surprising and unexpected benefits. The construction is particularly non-complex, its components few in number, and its operation is intuitive and easily understood by most users. Further, the clamp is adjustable and flexible in use, such as by allowing the handle to be rotated about the axis of threaded rod 115 for increased clamping strength.

It is contemplated that there may be times when the tube-engaging bracket (similar to 124) is fixed to the frame-supporting bracket 122 instead of being pivoted thereto. In such case, it is contemplated that the bracket (124) can be welded to the bracket (122) or fixedly secured by a bolt(s).

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. In combination, a bimini extender apparatus and a pontoon boat having a deck with defined surface area, perimeter railing, and a primary bimini for shade, the bimini extender apparatus including:
   a flexible cover having a surface area of at least about one-third of the defined surface area of the pontoon boat and extending generally horizontally at a level approximating an edge of the primary bimini;
   a framework attached to one or both of the deck and the perimeter railing;
   a rear attachment structure attaching the flexible cover to one of the deck, the perimeter railing, and the primary bimini; and
   a front attachment structure attaching the flexible cover to the framework with the flexible cover arranged to shade an additional portion of the deck surface area.

2. The combination defined in claim 1, wherein the framework is collapsible.

3. The combination defined in claim 1, wherein the framework includes attachments that are easily removable from the pontoon boat.

4. The combination defined in claim 1, wherein the rear attachment structure is releasably attached to the flexible cover.

5. The combination defined in claim 1, wherein the framework includes stabilizers, at least one of which is pivoted to the perimeter railing of the pontoon boat.

6. The combination defined in claim 1, wherein the rear attachment structure attaches to the primary bimini's framework.

7. The combination defined in claim 6, wherein the rear attachment structure is looped around parts of the primary bimini's framework.

8. The combination defined in claim 1, wherein the framework includes an inverted U-shaped frame attached to the deck of the pontoon boat.

9. The combination defined in claim 8, wherein the framework is vertically extendable for height adjustment.

10. The combination defined in claim 8, wherein the framework includes side struts.

11. The combination defined in claim 10, wherein the side struts include vertically-telescoping tubes.

12. The combination defined in claim 1, wherein the framework is horizontally extendable.

13. The combination defined in claim 1, wherein the cover overlaps with the primary bimini.

14. The combination defined in claim 1, wherein the cover combines with the primary bimini to substantially cover the entire deck surface of the pontoon boat.

15. The combination defined in claim 1, wherein the frame is fastened to the pontoon boat with attachment structure adapted to be removed without separate tools.

16. The combination defined in claim 1, wherein the framework is attached to the railing of the pontoon boat with clamps that engage opposite sides of the railing and that includes a handle with over center cam for clamping engagement.

17. An auxiliary bimini for a pontoon having a deck, a perimeter railing, and a primary bimini with a primary-bimini-supporting structure, comprising:
   a front inverted U-shaped frame including side-located vertical struts and a cross brace releasably connecting a top of the vertical struts;
   a first bracket on each of the struts of the front frame, the first bracket releasably anchoring the front frame to one of the deck and the railing;
   first and second stabilizer tubes supporting each of the struts and extending at an angle to the struts, the tubes each having a top portion engaging an associated one of the struts and having a bottom portion configured to engage one of the deck and perimeter railing;
   a flexible cover with a front edge connected at multiple locations to the cross brace of the front frame and having a rear edge with straps for releasable connection to the primary-bimini-supporting structure so that the flexible cover extends generally horizontally to provide walk-under shading on the deck; and
   whereby the vertical struts, the cross brace, and the cover can be assembled on the pontoon for use, or disassembled and released from the pontoon for storage.

18. The auxiliary bimini defined in claim 17, wherein the struts each are vertically adjustable to change a height at which the cover is held.

19. The auxiliary bimini defined in claim 17, wherein the struts include attachment brackets that are removable without the need for separate tools.

20. The auxiliary bimini defined in claim 17, wherein the cover has a transverse beam extending generally parallel the front cross brace and that holds a middle portion of the cover higher than side edges of the cover.

21. The auxiliary bimini defined in claim 17, wherein the cover includes hook-and-loop attachment patches on straps for looping connection to the cross brace.

22. The auxiliary bimini defined in claim 17, wherein the front frame includes clamp brackets for adjustably engaging the perimeter hand railing.

23. A clamping mechanism comprising:
   separate first and second clamping members each including a tube-engaging end and a clamp end, the tube-engaging ends opposing each other to define a square pocket for receiving a tube railing, at least one of the outer ends of the tube-engaging ends include a lip for engaging an outer side surface of the tube to ensure positive engagement with the tube, the clamp ends including aligned holes, respectively, with the hole in the lower clamp member being threaded; and
   a handle assembly with a threaded rod shaped to fit slidably through the aligned holes in the clamp ends and threadably engaging the hole in the clamp end of the second clamping member, and further including a handle movably mounted on a top of the rod between release and clamped positions, the handle including a cam that tensions the threaded rod for selectively tightening the upper clamp member against the lower clamp member when the handle is moved to the clamped position and for loosening the upper clamp member when the handle is moved to the release position; and a frame-engaging bracket defining a pivot and attached to the first clamp member adjacent and on a same side as the handle assembly.

24. The clamping mechanism defined in claim 23, wherein the frame-engaging bracket is pivoted to the first clamp member.

25. A clamping mechanism comprising:

separate first and second clamping members each including a tube-engaging end and a clamp end, the tube-engaging ends opposing each other to define a square pocket for receiving a tube railing, at least one of the outer ends of the tube-engaging ends include a lip for engaging an outer side surface of the tube to ensure positive engagement with the tube, the clamp ends including aligned holes, respectively, with the hole in the lower clamp member being threaded and further including abutting surfaces that inter-engage to cause the tube-engaging ends to clamp on the tube railing without skewing or twisting when moved toward a clamped position; and a handle assembly with a threaded rod shaped to fit slidably through the aligned holes in the clamp ends and threadably engaging the hole in the clamp end of the second clamping member, and further including a handle movably mounted on a top of the rod between release and clamped positions, the handle including a cam that tensions the threaded rod for selectively tightening the upper clamp member against the lower clamp member when the handle is moved to the clamped position and for loosening the upper clamp member when the handle is moved to the release position.

26. The combination defined in claim 1, wherein the framework includes a pair of spaced-apart vertical corner posts that are vertically adjustably extendable and further includes angled corner stabilizer tubes on each of the corner posts that engage the corner posts at an angle to stabilize and maintain a vertical position of the corner posts.

\* \* \* \* \*